(12) United States Patent
Fujishiro et al.

(10) Patent No.: US 6,269,123 B1
(45) Date of Patent: Jul. 31, 2001

(54) VIDEO ENCODER AND VIDEO ENCODING METHOD

(75) Inventors: Shigeo Fujishiro; Osamu Matsunaga, both of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/247,432

(22) Filed: Feb. 10, 1999

(30) Foreign Application Priority Data

Feb. 13, 1998 (JP) .................................................. 10-031614

(51) Int. Cl.[7] .............................. H04B 1/66; H04N 7/12
(52) U.S. Cl. .................................................... 375/240.29
(58) Field of Search .......................... 375/240, 240.01, 375/240.02, 240.03, 240.04, 240.25, 240.15, 240.26, 240.19, 240.29; 348/441, 442; H04B 1/66; H04N 7/12

(56) References Cited

U.S. PATENT DOCUMENTS

| | | | |
|---|---|---|---|
| 5,438,374 | * 8/1995 | Yan | 348/620 |
| 5,596,659 | * 1/1997 | Normile et al. | 382/253 |
| 5,686,962 | * 11/1997 | Chung et al. | 348/402 |
| 5,790,195 | * 8/1998 | Ohsawa | 348/419.1 |
| 5,819,035 | * 10/1998 | Devaney et al. | 395/200.32 |
| 6,028,965 | * 2/2000 | Normile | 382/250 |
| 6,088,489 | * 7/2000 | Miyake | 382/299 |

OTHER PUBLICATIONS

Kronander, T., Post and pre-processing in coding of image sequences using filter motion compensation history, Acoustic, Speech, and Signal Processing, 1998. ICASSP-88., 1988 International Conference on, 1988, pp. 1104–1107.*

Zamier, R., Information rates of pre/post–filters dithered quantizers, information Therory, IEEE Transaction on, vol: 42 Issue:5, Sep. 1996, pp. 1340–1353.*

* cited by examiner

*Primary Examiner*—Chris Kelley
*Assistant Examiner*—Tung Vo
(74) *Attorney, Agent, or Firm*—Frommer Lawrence & Haug, LLP.; William S. Frommer

(57) ABSTRACT

A video encoder for reducing the deterioration of picture quality of a compress coded video signal by implementing a method for deciding the number of picture elements needed to properly encode an inputted video signal. The decision is calculated based on the difficulty of compressing the inputted video signal and the number of picture elements needed to accurately reproduce a compressed inputted video signal. The decision circuitry decides the number of picture elements needed for compression of the inputted video signal allowing the number of codes generated in the encoding process to be decreased and quantization accuracy improved. The main advantage is a reduction in deterioration of the video signal usually found when reproducing a compress coded video signal.

10 Claims, 4 Drawing Sheets

VIDEO ENCODER AND VIDEO ENCODING METHOD

BACKGROUND OF THE INVENTION

1. Field of the Invention

The present invention relates to a video encoder and video encoding method and more specifically, is preferably applied to a video signal encoder, for instance, used for a digital broadcasting system.

2. Description of the Related Art

Various kinds of compress-coding methods have been proposed for decreasing video and audio information. A method called moving picture experts group phase 2 (MPEG2) has been introduced as a representative one. A digital broadcasting system, which compress-encodes video and audio broadcasting data with employing the MPEG2 method and broadcasts the resultant via a ground wave and satellite wave, has been started.

FIG. 1 generally shows a video signal encoder 50. A video signal D1 is inputted from a video signal supply device (not shown) such as a video tape recorder or the like, to a prefilter 51. The video signal D1 is subjected to a band restriction process corresponding to a frequency characteristic control signal D55 supplied from a quantization rate control section 55 in the prefilter 51. Thereby, the high frequency component of the video signal is reduced and the video signal is outputted to a picture element number converting section 52 as a band restricted video signal D51. Note that, the high frequency component of the video signal represents relatively minute parts of an image. The high frequency component is reduced to the degree that the minute section of the image is omitted, and the bandwidth of the video signal is reduced, while only a small influence is applied to the entire image.

The picture element number converting section 52 executes a picture element number converting process on the inputted band restricted video signal D51. Assuming that the number of horizontal picture elements of the video signal D1 inputted to the encoder 50 is the number M of horizontal picture elements, the picture element number converting section 52 reduces the number of horizontal picture elements of the band restricted video signal D51 obtained by restricting the band of the video signal D1 to the number N of reduced horizontal picture elements with a relation of N<M. The resultant signal is transmitted to a encoding section 53 as a picture element number converted video signal D52. The number N of the reduced horizontal picture elements is set to a large value in a program which requires a high picture quality: and to a small value in a program which does not require a high picture quality, based on the contents of the program in the video signal D1.

The encoding section 53 executes on the picture element number converted video signal D52, a movement compensating process, a discrete cosine transform (DCT) process, a quantization process and a variable length coding (VLC) process, in order to transmit the resultant to a buffer 54 as variable length coded data D53. At this time, the encoding section 53 adjusts a quantization rate in the quantization process based on a quantization control signal D56 supplied from a quantization rate control section 55. Further, encoding section control information D57 is supplied from a encoding section control circuit 57 to the encoding section 53. The encoding section 53 sets a coding timing and a movement vector search range in the movement compensating process according to the encoding section control information D57.

When the movement of the video image in the video signal D1 is large, or the video image is complicated, the generated code of the variable length coded data D53 obtained by compress-coding the video signal D1 is increased. The video signal having the large number of generated codes by such a compress-coding is referred to as a video signal with a high degree of difficulty in compression. The degree of difficulty in compression varies based on the contents or scenes of the program in the video signal. Therefore, the quantization value of the quantization process in the encoding section 53 and the band restriction in the prefilter 51 are controlled based on the variable length coded data D53 occupied in the buffer 54. Thus, the number of generated codes for predetermined term, for example, each group of pictures (GOP) is controlled so as to be kept constant.

In other words, the quantization rate control section 55 constantly monitors the accumulated state of the variable length coded data D53 in the buffer 54 in order to obtain an accumulated state as occupation rate information D54. Then, the quantization rate control section 55 generates the quantization control signal D56 and the frequency characteristic control signal D55 based on the occupation rate information D54 in order to supply them respectively to the encoding section 53 and the prefilter 51. Thereby, the section 55 controls the number of generated codes of the variable length coded data D53 constant for each predetermined period.

In the above video signal encoder 50, the bandwidth reduced by the prefilter 51 varies according to the degree of difficulty in compressing the video signal D1. On the other hand, the number N of horizontal picture elements reduced by the picture element number converting section 52 is constant according to the contents of the program in the video signal D1. Therefore, the number N of horizontal picture elements of the picture element number reduced video signal D52 happens to exceed the number of horizontal picture elements necessary for representing the video image of the band restricted video signal D51. In this case, the number of picture elements exceeding the requirement for representing the video image of the band restricted video signal D51 are to be encoded. Accordingly, the quantization value in the quantization process is unnecessarily increased and disadvantageously results in the deterioration of the picture quality.

SUMMARY OF THE INVENTION

In view of the foregoing, an object of this invention is to provide a video encoder and video encoding method for performing band restriction process and picture element number conversion process corresponding to the degree of difficulty in compressing an image.

The foregoing object and other objects of the invention have been achieved by the provision of a video encoder having a signal band reducing means for reducing the signal band of a video signal and a picture element number converting means for converting the number of picture elements of the video signal, so that the number of picture elements can be converted in the picture element number converting means so as to be adapted to the number of picture elements corresponding to the signal band reduced by the signal band reducing means.

A video encoder for compress-coding and transmitting an inputted video signal, comprises signal band reducing means for reducing the signal band of said inputted video signal; picture element number converting means for converting the number of picture elements of said inputted video signal based on said reduced signal band; and coding means for compress-coding said inputted video signal, the number of picture elements of which is converted by said picture element number converting means.

A video encoding method of compress-coding and transmitting an inputted video signal, comprises the steps of reducing the signal band of said inputted video signal; converting the number of picture elements of said inputted video signal based on said reduced signal band; and compress-coding said inputted video signal, the number of picture elements of which is converted by said picture element number converting step.

The nature, principle and utility of the invention will become more apparent from the following detailed description when read in conjunction with the accompanying drawings in which like sections are designated by like reference numerals or characters.

DETAILED DESCRIPTION OF THE EMBODIMENT

Figure 1:
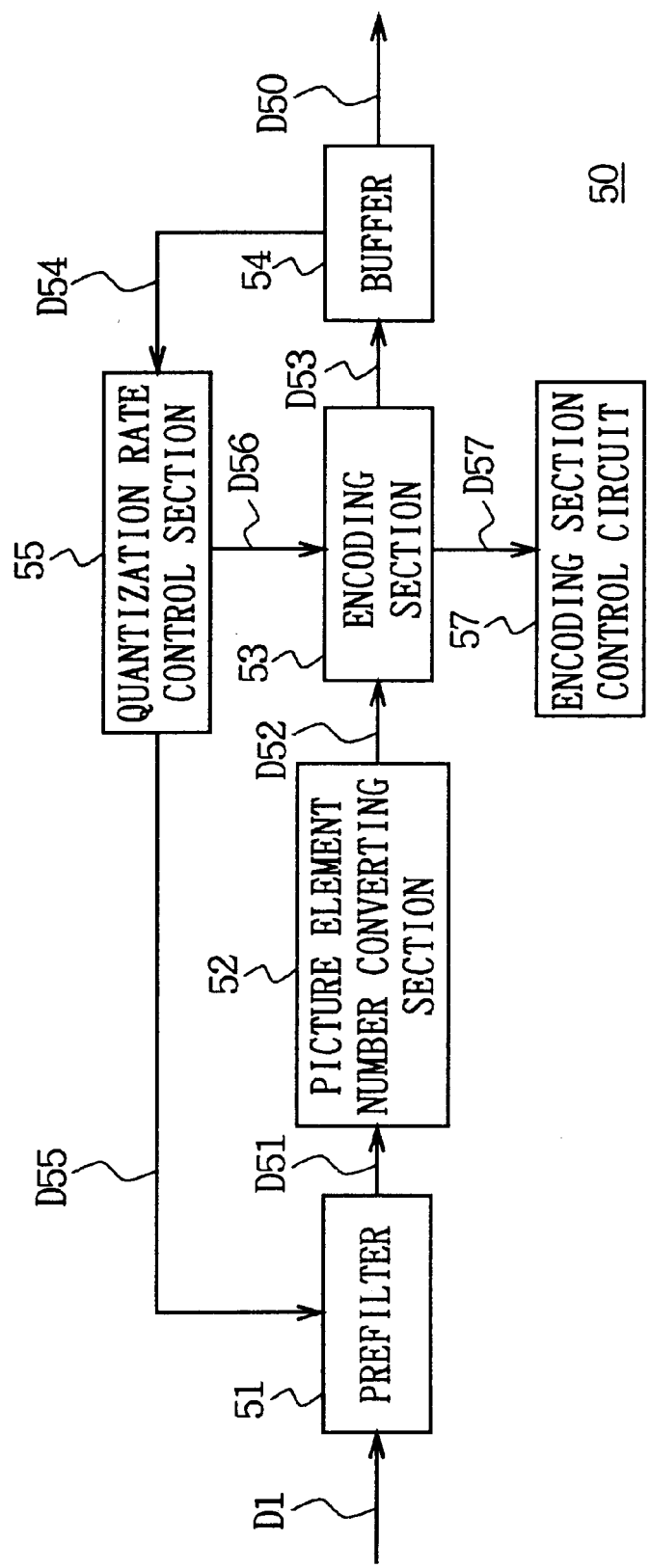
FIG. 1 is a block diagram showing a video signal encoder.
Figure 2:
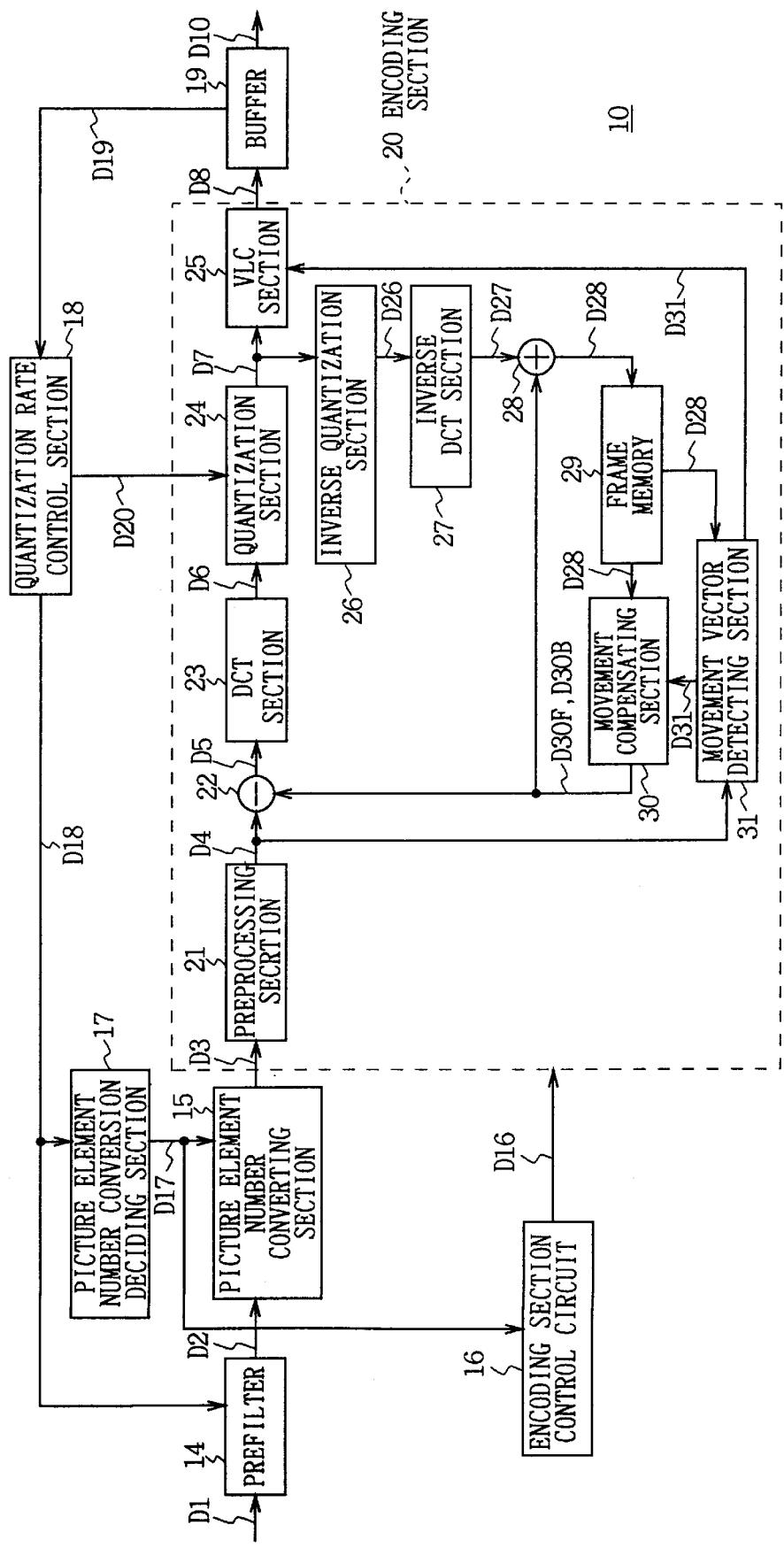
FIG. 2 is a is a block diagram showing a video signal encoder according to the present invention.

Preferred embodiments of this invention will be described with reference to the accompanying drawings:

FIG. 2 generally shows a video signal encoder 10. A video signal D1 of an high definition television (HDTV) standard is inputted from a video signal supply device (not shown) such as a video tape recorder, to a prefilter 14.

The prefilter 14 is a horizontal frequency low-pass filter. The prefilter 14 performs a band restriction process for reducing the high frequency component of the video signal D1 according to a frequency characteristic control signal D18 supplied from a quantization rate control section 18. Thereby, the bandwidth of the image signal is reduced, however, to the degree that the entire video image is kept unchanged, by omitting minute parts of a video image, so that the resultant band restricted video signal D2 is outputted to a picture element number converting section 15.

The picture element number converting section 15 reduces the number of horizontal picture elements of the inputted band restricted video signal D2 based on a picture element number control signal D17 supplied from a picture element number conversion deciding section 17, and outputs the resultant as a picture element number converted video signal D3 to a encoding section 20. For example, assuming that the number of horizontal picture elements of the video signal D1 inputted to the encoder 10 is 1920, the picture element number converting section 15 reduces the number of horizontal picture elements of the band restricted video signal D2, which is obtained by restricting the band of the video signal D1, to the number N of reduced horizontal picture elements with a relation of N<1920. Then, the section 15 transmits the resultant to the encoding section 20 as a picture element number converted video signal D3.

In this case, the picture element number conversion deciding section 17 generates the picture element number control signal D17 based on the frequency characteristic control signal D18 transmitted from the quantization rate control section 18. Initially, the picture element number conversion deciding section 17 obtains the number N' of required horizontal picture elements, which is necessary for producing the image of the band restricted video signal D2, based on the bandwidth, which is indicated by the frequency characteristic control signal D18, acquired by the high frequency component reducing process. Assuming that the bandwidth is FHz and the horizontal scanning time of the band restricted video signal D2 is Th seconds, N' picture elements is expressed by the following equation.

$$N'=2F \cdot Th$$

Subsequently, the picture element number conversion deciding section 17 selects the minimum value of set value Ns of horizontal picture elements, which satisfies the condition of N'<Ns from a plurality of set value Ns of horizontal picture element which are previously set. The selected minimum set value is determined as the number N of reduced horizontal picture elements. In this embodiment, the following four kinds of 1440 pixels, 1280 pixels, 1152 pixels and 960 pixels are previously set as set values Ns of horizontal picture elements. Then, the picture element number conversion deciding section 17 transmits an identification number corresponding to each set values of horizontal picture elements as the picture element number control signal D17, to the picture element number converting section 15 and a encoding section control circuit 16. Assuming that the number of set values of horizontal picture elements is j, the picture element number control signal D17 is expressed by a signal of k bits ($j \leq 2^k$).

Thus, the band restricted video signal D2, the number of picture elements of which is reduced to the number N of reduced horizontal picture elements sufficient to express the band restricted video signal D2 in the picture element number converting section 15, is transmitted to the encoding section 20 as the picture element number converted video signal D3.

Figure 3:
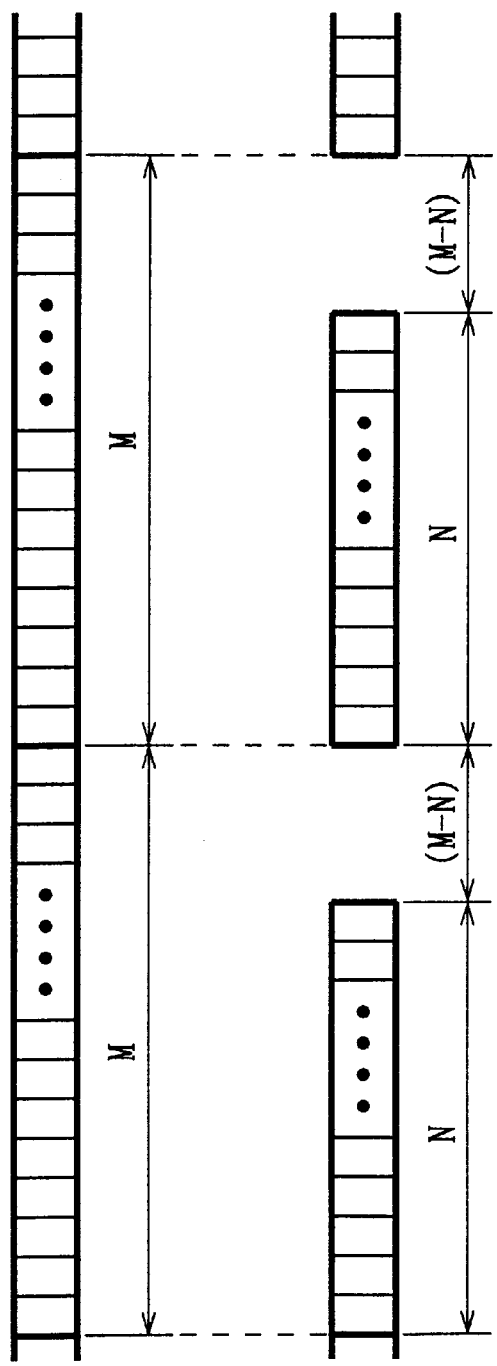
FIGS. 3A and 3B are diagrammatic views showing the decrease in the number of picture elements.

The encoding section control circuit 16 generates a encoding section control signal D16 based on the picture element number control signal D17 and supplies the signal S16 to the encoding section 20. The encoding section 20 executes encoding process corresponding to the number of the horizontal picture elements of the picture element number converted video signal D3, based on the encoding section control signal D16. More specifically, the picture elements of the band restricted video signal D2 having the number M of horizontal picture elements shown in FIG. 3A is converted in the picture element number converting section 15, and the resultant is transmitted to the encoding section 20 as a picture element number converted video signal D3 having the number N of horizontal picture elements shown in FIG. 3B. Note that, the picture element number converted video signal D3 is not continuously transmitted. As shown in FIG. 3B, after a number N of picture elements are continuously transmitted, the transmission of picture elements is stopped for the period of the number (M−N) of picture elements. That is, the encoding section 20 performs an encoding operation during the period of number N of picture elements based on the encoding section control signal D16, and stops the coding operation during a period of the number (M−N) of picture elements. Thereby, keeping the operating clock constant, the encoding section 20 executes the encoding process corresponding to the number of horizontal picture elements of the picture element number converted video signal D3. Further, the encoding section 20 sets a movement vector search range in a movement compensating process based on the encoding section control signal D16.

In the encoding section 20 (shown in FIG. 2), the picture element number converted video signal D3 is inputted to a preprocess section 21. The preprocess section 21 classifies each frame picture of the sequentially-inputted picture element number converted video signal D3, into three picture types: an I-picture, a P-picture and a B-picture, and selects a suitable process for each frame based on the picture type which the frame classified into. Then, the preprocessing section 21 rearranges the frame pictures in the order of encoding based on the classified picture type. Further, the preprocess section 21 divides the frame pictures into macro blocks comprising luminance signals of 16 picture elements×16 lines and color difference signals corresponding to the luminance signals. Thereby, the section 21 generates macro block data D4 in order to supply to an arithmetic circuit 22 and a movement vector detecting section 31.

The movement vector detecting section 31 calculates the movement vector of each macro block of the macro block data D4, based on the macro block data D4 and reference picture data D28 stored in a frame memory 29. Then, the section 31 transmits the resultant as movement vector data D31 to a movement compensating section 30 and a variable length coding (VLC) section 25.

The arithmetic circuit 22 performs movement compensation in any of the following predictive modes: an intra mode, a forward direction predictive mode, a backward direction predictive mode and a mutual direction predictive mode, on the macro block data D4 supplied from the preprocess section 21, based on the image type of each macro block of the macro block data D4. Note that, the intra mode refers to a method for dealing frame pictures to be encoded as transmission data as it is. The forward direction predictive mode is a method for dealing the predictive remainder between the frame pictures to be encoded and past reference pictures as transmission data. The backward direction predictive mode is a method for dealing the predictive remainder between the frame pictures to be encoded and future reference pictures as transmission data. The mutual direction predictive mode is a method for dealing the predictive remainder between the frame pictures to be encoded and the average value of two predictive pictures of past reference pictures and future reference pictures as transmission data.

Initially, a case that the macro block data D4 is composed of I-pictures will be described. The macro block data D4 is processed in the intra mode. That is, the arithmetic circuit 22 transmits the macro blocks of the macro block data D4 to a discrete cosine transform (DCT) section 23 as arithmetic data D5 as it is. The DCT section 23 performs a DCT conversion process on the arithmetic data D5 in order to obtain a DCT coefficient, and transmits the resultant to a quantization section 24 as DCT coefficient data D6. The quantizaion section 24 executes a quantization process on the DCT coefficient data D6, and transmits the resultant to the VLC section 25 and an inverse quantization section 26 as quantization DCT coefficient data D7. At this time, the quantization section 24 adjusts the quantization value based on a quantization control signal D20 supplied from the quantization rate control section 18, so that the amount of generated code is controlled.

The inverse quantization section 26 executes inverse quantization process on the received quantization DCT coefficient data D7 and transmits the resultant to an inverse DCT section 27 as DCT coefficient data D26. Then, the inverse DCT section 27 executes inverse DCT process on the DCT coefficient data D26 and transmits the resultant to an arithmetic circuit 28 as arithmetic data D27. In this case, the data D27 is transmitted via the arithmetic circuit 28 without any process, to be stored in the frame memory 29 as reference picture data D28.

Next, a case the macro block data D4 is composed of P-pictures will be described. The arithmetic circuit 22 executes a movement compensating process on the macro block data D4 in either of the predictive mode: that is, the intra mode or the forward direction predictive mode.

When the predictive mode is the intra mode, the arithmetic circuit 22 transmits the macro blocks of the macro block data D4 as it is to the DCT section 23 as arithmetic data D5, as well as the case of macro block data D4 comprising I-pictures.

On the other hand, when the predictive mode is the forward direction predictive mode, the arithmetic circuit 22 performs subtraction process on the macro block data D4 by using forward direction predictive picture data D30F supplied from the movement compensating section 30.

Note that, the forward direction predictive picture data D30F is obtained by performing movement compensation on the reference picture data D28 stored in the frame memory 29 based on the movement vector data D31. That is, in the forward direction predictive mode, the movement compensating section 30 shifts the read address of the frame memory 29 based on the movement vector data D31, in order to read the reference picture data D28. Then, the section 30 supplies the read data 28 to the arithmetic circuit 22 and the arithmetic circuit 28, as the forward direction predictive picture data D30F. The arithmetic circuit 22 subtracts the forward direction predictive picture data D30F from the macro block data D4 in order to obtain difference data as a predictive remainder, and transmits the resultant to the DCT section 23 as the arithmetic data D5.

Further, the forward direction predictive picture data D30F is supplied to the arithmetic circuit 28 from the movement compensating section 30. The arithmetic circuit 28 adds the data D30F with the arithmetic data D27, so that the reference picture data D28 (P-picture) is partly reproduced and the resultant is stored in the frame memory 29.

Next, a case the macro block data D4 comprises B-pictures is supplied to the arithmetic circuit 22 from the preprocess section 21 will be described. The arithmetic circuit 22 executes on macro block data D4, a movement compensating process in any of the following modes: the intra mode, the forward direction predictive mode, the backward direction predictive mode or the mutual direction predictive mode.

When the predictive mode is the intra mode or the forward direction predictive mode, the macro block data D4 undergoes the same process as in the case of the P-pictures. Note that, as the B-pictures are not employed as other predictive reference pictures, the reference picture data D28 is not stored in the frame memory 29.

On the other hand, when the predictive mode is the backward direction predictive mode, the arithmetic circuit 22 performs subtraction process on the macro block data D4 by using backward direction predictive picture data D30B supplied from the movement compensating section 30.

The backward direction predictive picture data D30B is calculated by performing movement compensation on the reference picture data D28 stored in the frame memory 29 based on the movement vector data D31. More specifically, in the backward direction predictive mode, the movement compensating section 30 shifts addresses read by the frame memory 29, based on the movement vector data D31 in order to read the reference picture data D28. Then, the section 30 supplies the resultant to the arithmetic circuit 22 and the arithmetic circuit 28 as the backward direction predictive picture data D30B. The arithmetic circuit 22 subtracts the backward direction predictive picture data D30B from the macro block data D4 in order to obtain difference data as a predictive remainder, and transmits the resultant to the DCT section 23 as the arithmetic data D5.

Further, the backward direction predictive picture data D30B is supplied from the movement compensating section 30 to the arithmetic circuit 28. The arithmetic circuit 28 adds the backward direction predictive picture data D30B to the arithmetic data D27, so that the circuit 28 partly reproduces the reference picture data D28 (B-picture). However, as B-pictures are not used as other predictive reference pictures, the reference picture data D28 is not stored in the frame memory 29.

When the predictive mode is the mutual direction mode, the arithmetic circuit 22 subtracts the average value of the forward direction predictive picture data D30F and the backward direction predictive picture data D30B supplied from the movement compensating section 30, from the macro block data D4. Thereby, the circuit 22 obtains difference data as a predictive remainder and transmits the resultant to the DCT section 23 as the arithmetic data D5.

Further, the forward direction predictive picture data D30F and the backward direction predictive picture data D30B are supplied from the movement compensating section 30 to the arithmetic circuit 28. The arithmetic circuit 28 adds the average value of the forward direction predictive picture data D30F and the backward direction predictive picture data D30B with the arithmetic data D27 in order to reproduce partly the reference picture data D28 (B-picture). However, as the B-pictures are not employed as other predictive reference pictures, the reference picture data D28 is not stored in the frame memory 29.

Thus, the picture element number converted video signal D3 inputted to the encoding section 20, is subjected to a movement compensating process, a DCT process and a quantization process in order to be supplied to the VLC section 25 as the quantization DCT coefficient data D7.

The VLC section 25 performs a variable length encoding process based on a prescribed conversion table on the quantization DCT coefficient data D7 and the movement vector data D31 in order to transmit the resultant to a buffer 19 as variable length coded data D8. In the buffer 19, the variable length coded data D8 is temporarily stored and then, read out sequentially as variable length coded data D10.

The quantization rate control section 18 successively monitors the accumulated state of the variable length coded data D8 stored in the buffer 19, and deals the resultant as occupation rate information D19. Then, the quantization rate control section 18 generates a frequency characteristic control signal D18 and a quantization control signal D20 based on the occupation rate information D19, in order to transmit the resultant respectively to the prefilter 14 and the quantization section 24. Thereby, the section 18 adjusts the bandwidth in the band reducing process and the quantization value in the quantization process.

The number of picture elements in the picture element number converted video signal D3 is reduced to less than that of the video signal D1. Therefore, the number of macro blocks of the macro block data D4 formed by dividing the picture image of the signal D3 into 16 pixels×16 lines is also reduced. The total movement vector in the movement compensating process is substantially proportional to the number of macro blocks. Thus, the number of macro blocks of the macro block data D4 decreases and accordingly, the number of generated code of the movement vector data D31 also decreases. Therefore, the number of generated code of the variable length coded data D8 obtained by performing a variable length encoding process on the DCT coefficient data D7 and the movement vector data D31 is decreased. Accordingly, the variable length coded data D8 stored in the buffer 19 is also decreased.

Therefore, assuming that the number of generated code of the variable length coded data D10 is constant, the quantization rate control section 18 minutely controls the quantization value in the quantization section 24 in relation to the decrease in the variable length coded data DS stored in the buffer 19. Thereby, the DCT coefficient data D6 can be quantized by a more minute quantization value in accordance with the decrease in the generated code of the movement vector data D31 due to the decrease in the number of macro blocks. Therefore, the quantize accuracy can be improved.

In the above configuration, the video signal D1 inputted to the video signal encoder undergoes the band reducing process in the prefilter 14, and the resultant is transmitted to the picture element number converting section 15 as the band restricted video signal D2. At this time, the quantization rate control section 18 controls the band reduction in the prefilter 14 according to the degree of difficulty in compressing the video signal D1.

The picture element number converting section 15 reduces the picture element number in the band restricted video signal D2, to the minimum number of picture elements necessary for representing the band restricted video signal D2, in order to transmit the resultant to the encoding section 20 as the picture element number reduced video signal D3. At this time, since the number of picture elements is decreased, the number of macro blocks is also decreased.

The encoding section 20 executes on the picture element number reduced video signal D3, movement compensating process, a DCT converting process, a quantization process and a variable length encoding process and outputs the resultant to the buffer 19 as the variable length coded data D8. At this time, the quantization rate control section 18 controls the quantization value at the quantizaion process in the encoding section 20 according to the degree of difficulty in compressing the video signal D1.

The picture element number reduced video signal D3 has the less number of macro blocks than that of the band restricted video signal D2. Since the generated code of the movement vector under the movement compensating process is substantially proportional to the number of macro blocks, the generated code of the movement vector of the variable length coded data D8 obtained by encoding the picture element number reduced video signal D3 is also decreased. When the generated code of the movement vector is reduced, a DCT coefficient can be quantized by more minute quantization value. Hence, deterioration in picture quality can be avoided.

According to the above configuration, the prefilter for reducing the signal band of the video signal, and the picture element number converting section for converting the number of picture elements of the video signal are provided. The picture element number converting section executes picture element number conversion on video signals, so as to correspond to the number of picture elements according to the signal band reduced by the prefilter and to encode the minimum number of required picture elements. Thus, the quantization value in the quantization process can be prevented from becoming unnecessarily large, deterioration of the picture quality by the encoding process can be prevented.

Figure 4:
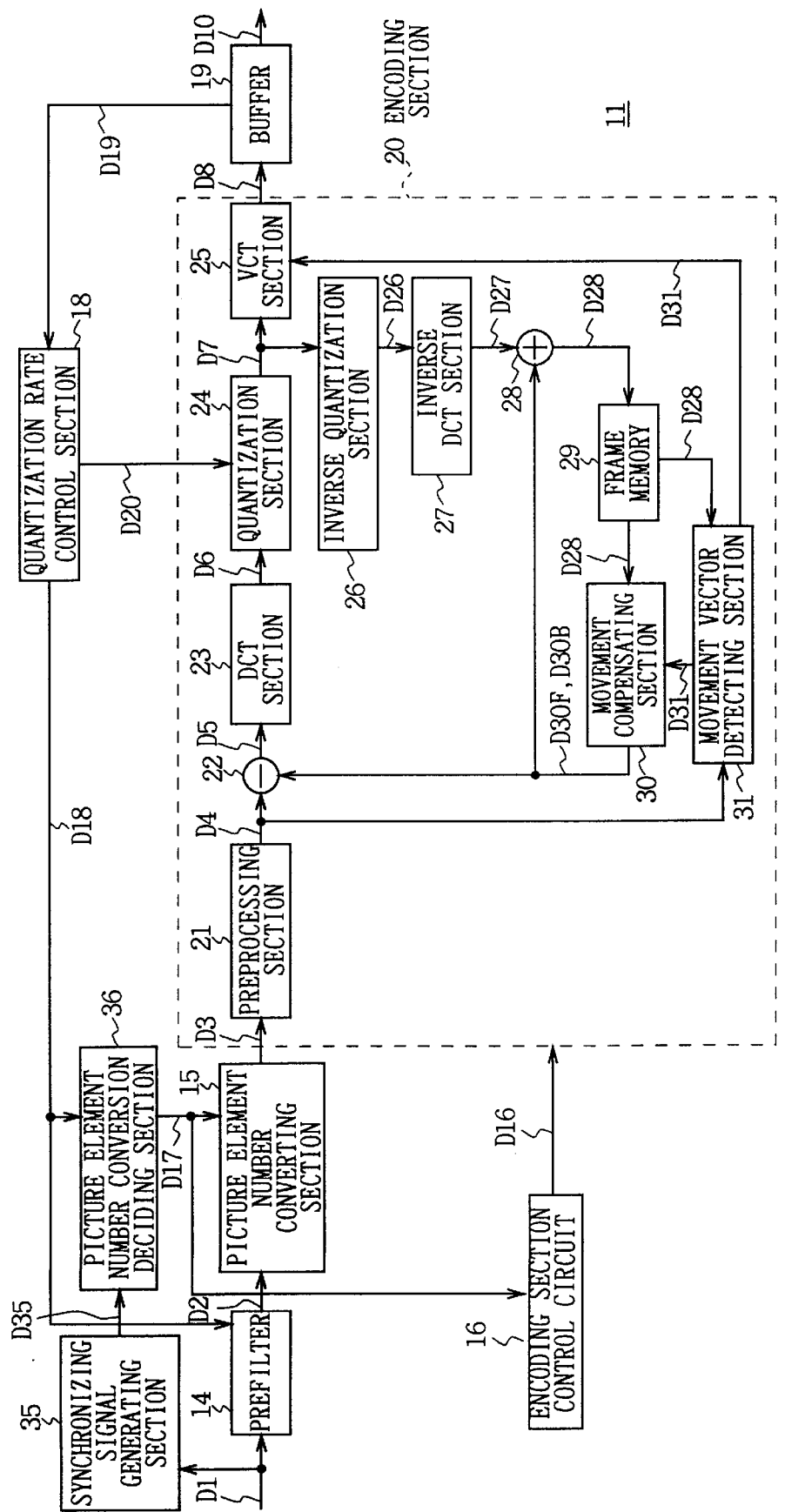
FIG. 4 is a block diagram showing a video signal encoder according to another embodiment.

In the above embodiment, the picture element number conversion deciding section 17 transmits the picture element number control signal D17 in accordance with the frequency characteristic control signal D18 sent from the quantization rate control section 18. However, the present invention is not limited to this. The frame of the video signal D1 can be detected and the picture element number control signal D17 can be sent synchronously with a frame cycle. More specifically, in FIG. 4 the same sections having the same reference numerals as in FIG. 2, 11 generally shows an encoder. A video signal D1 is supplied to a prefilter 14 and a synchronizing signal generating section 35 from a video signal supply device (not shown). A synchronizing signal generating section 35 detects the frame cycle of the video signal D1 and transmits a synchronizing signal D35 synchronized with the frame cycle to a picture element number conversion deciding section 36. The picture element number conversion deciding section 36 transmits a picture element number control signal D17 to a picture element number converting section 15 synchronously with the synchronizing signal D35. The picture element number converting section 15 performs a picture element number converting process on a band restricted video signal D2 by the frame based on the picture element number control signal D17.

Further, according to the above embodiment, the number of horizontal picture elements to be converted in the picture element number converting process is set at 1440 pixels, 1280 pixels, 1152 pixels and 960 pixels. However, the present invention is not limited to this. Other Numbers of horizontal picture elements can be used.

Additionally, according to the above embodiment, the video signal D1 is a video signal of the HDTV standard. However, the present invention is not limited to this. A video signal of other standard can be inputted.

Furthermore, according to the above embodiment, the number of horizontal picture elements is reduced according to the degree of difficulty in compressing a picture image. However, the present invention is not limited to this. The number of vertical picture elements; that is, the number of scanning lines can be reduced. Also, the number of vertical and horizontal picture elements; that is, the number of scanning lines and the number of horizontal picture elements, can be simultaneously reduced.

As described above, according to the present invention, a signal band reducing means for reducing the signal band of the video signal and a picture element number converting means for converting the number of picture elements of the video signal are provided. Picture element number conversion is executed in the picture element number converting means so as to correspond to the number of picture elements corresponding to the signal band reduced by the signal band reducing means. Thereby, the number of generated code in the encoding process can be decreased, and the quantization accuracy in the quantization process can be improved. Thus, the deterioration of picture quality in the encoding process can be prevented.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A video encoder for compress-coding and transmitting an inputted video signal, containing high and low frequency signal bands and a plurality of horizontal and vertical picture elements, comprising:

a pass filter for reducing the signal band of said inputted video signal generating a reduced bandwidth video signal;

a picture element conversion decider for deciding an amount of picture elements required for reducing deterioration of a compressed video signal while compressing said reduced bandwidth video signal based on a degree of difficulty for compressing said inputted video signal;

a picture element converter for reducing the number of picture elements of said reduced bandwidth video signal based on the number of picture elements decided by said picture element number decider, said picture element converter generates a twice reduced bandwidth video signal ; and an encoder for compress coding said twice reduced bandwidth video signal.

2. The video encoder according to claim 1, wherein said pass filter reduces the signal band of said inputted video signal based on the degree of difficulty in compress coding said inputted video signal.

3. The video encoder according to claim 1, wherein said pass filter is a horizontal frequency low-pass filter for setting a plurality of pass bandwidths.

4. The video encoder according to claim 1, wherein said picture element converter reduces the number of horizontal picture elements of said reduced bandwidth video signal.

5. The video encoder according to claim 1, wherein the picture element converter converts said picture elements based on the frame synchronizing signals of said inputted video signal.

6. A video encoding method of compress-coding and transmitting an inputted video signal, containing high and low frequency signal bands and a plurality of horizontal and vertical picture elements, comprising the steps of:

reducing the signal band of said inputted video signal;

generating a reduced bandwidth video signal deciding an amount of picture elements required for reducing deterioration of a compressed video signal while compressing said reduced bandwidth video signal based on a degree of difficulty for compressing said inputted video signal;

reducing the number of picture elements of said reduced bandwidth video signal based on the number of picture elements decided by said picture element number decider, said picture element converter generates a twice reduced bandwidth video signal; and compress-coding said twice reduced bandwidth video signal.

7. The video encoding method according to claim 6, wherein said pass filter reduces the signal band of said inputted video signal based on the degree of difficulty in coding said inputted video signal.

8. The video encoding method according to claim 6, wherein said pass filter sets a plurality of pass bandwidths using a horizontal frequency low-pass filter.

9. The video encoding method according to claim 6, wherein said picture element converter reduces the number of horizontal picture elements of said reduced video signal.

10. The video encoding method according to claim 6, wherein said picture element converter converts said picture elements based on the frame synchronizing signals of said inputted video signal.

* * * * *